(12) United States Patent
O'Dea et al.

(10) Patent No.: US 8,340,881 B2
(45) Date of Patent: Dec. 25, 2012

(54) METHOD AND SYSTEM FOR ASSESSING VEHICLE MOVEMENT

(75) Inventors: Kevin A. O'Dea, Ann Arbor, MI (US); Hualin Tan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 349 days.

(21) Appl. No.: 12/776,181

(22) Filed: May 7, 2010

(65) Prior Publication Data

US 2011/0276242 A1 Nov. 10, 2011

(51) Int. Cl.
*B60B 39/00* (2006.01)
(52) U.S. Cl. .......................................... 701/71; 701/70
(58) Field of Classification Search ............... 701/70–71
See application file for complete search history.

(56) References Cited

U.S. PATENT DOCUMENTS

| | | | |
|---|---|---|---|
| 6,923,514 B1 * | 8/2005 | Spieker et al. ................ 303/199 |
| 7,617,036 B2 | 11/2009 | Tan et al. | |
| 2001/0029420 A1 * | 10/2001 | Kawasaki et al. ................ 701/80 |
| 2002/0036567 A1 * | 3/2002 | Larson ........................... 340/442 |
| 2003/0043031 A1 * | 3/2003 | Nowottnick et al. .......... 340/438 |
| 2005/0049773 A1 * | 3/2005 | Kitapini et al. ................. 701/70 |
| 2005/0085988 A1 * | 4/2005 | Ushiroda et al. ................ 701/80 |
| 2009/0177348 A1 * | 7/2009 | Yanagi ............................. 701/29 |
| 2009/0265073 A1 * | 10/2009 | Laiou et al. ..................... 701/93 |
| 2010/0198448 A1 * | 8/2010 | Ono et al. ........................ 701/29 |
| 2010/0217491 A1 * | 8/2010 | Naito et al. ..................... 701/49 |
| 2011/0190974 A1 * | 8/2011 | Wada .............................. 701/29 |
| 2011/0257847 A1 * | 10/2011 | Uematsu et al. ................ 701/48 |
| 2011/0295457 A1 * | 12/2011 | Linda et al. ..................... 701/29 |

* cited by examiner

*Primary Examiner* — Hussein A. Elchanti
(74) *Attorney, Agent, or Firm* — Ingrassia Fisher & Lorenz, P.C.

(57) ABSTRACT

Methods and systems are provided for assessing movement of a vehicle having a plurality of wheels. A plurality of wheel direction values are obtained. Each of the wheel direction values pertains to a direction of wheel rotation of a respective wheel. An average value of the wheel direction values is calculated. A direction of movement of the vehicle is obtained via a controller using the average value. In addition, a signed velocity is determined for and indicative of both forward and reverse motions using the wheel direction values.

18 Claims, 5 Drawing Sheets

METHOD AND SYSTEM FOR ASSESSING VEHICLE MOVEMENT

TECHNICAL FIELD

The present invention generally relates to vehicles, and more particularly relates to a method and system for assessing movement of vehicles.

BACKGROUND

Modern vehicles, such as automobiles, often include various electrical systems for monitoring and controlling vehicle operation. One such electrical system is known as electronic stability control (ESC). ESC systems improve the handling of vehicles by selectively adjusting the activity of wheels to reduce vehicle understeer and oversteer tendencies. ESC systems often utilize anti-lock braking systems (ABS) and traction control systems (TCS), which are designed to prevent the wheels from slipping, locking, or spinning, by reducing the braking force and power to the wheels, respectively. Other types of vehicle electrical systems for vehicles include, among others, object detection systems and automatic braking systems.

Such vehicle systems often utilize a vehicle velocity as an input for various calculations of the systems. A direction of movement of the vehicle may also be utilized under various circumstances. For example, in ESC systems, vehicle torque might only be adjusted when the vehicle is moving in a forward direction. By way of further example, in an object detection system, an object in front of the vehicle may be more likely to contact the vehicle if the vehicle is moving in a forward direction, and an object behind the vehicle may be more likely to contact the vehicle if the vehicle is moving in a reverse direction. By way of additional example, automatic braking might only be applied if the vehicle is moving in a forward direction. The direction of movement of the vehicle is typically determined using inertial sensor data (such as yaw rate, lateral acceleration, and longitudinal acceleration) and/or transmission data (such as the gear selected by the driver). However, such typical techniques may not always provide optimal results, for example, if the vehicle is in neutral, moving along a hill, and/or transitioning during braking to a wet or icy surface.

Accordingly, it is desirable to provide an improved method and system for determining a direction of a vehicle, for example that can be utilized under such circumstances in which typical techniques may not provide optimal results. It is further desirable to provide an improved method and system for determining a signed velocity for and indicative of both forward and reverse motions, for example that can be utilized under such circumstances in which typical techniques may not provide optimal results. Other desirable features and characteristics of the present invention will become apparent from the subsequent detailed description and the appended claims, taken in conjunction with the accompanying drawings and the foregoing technical field and background.

SUMMARY

In accordance with an exemplary embodiment, a method for assessing movement of a vehicle having a plurality of wheels is provided. The method includes the steps of obtaining a plurality of wheel direction values, calculating an average value of the plurality of wheel direction values; and determining a direction of movement of the vehicle using the average value via a controller. Each of the plurality of wheel direction values pertains to a direction of wheel rotation of a respective wheel of the plurality of wheels.

In accordance with another exemplary embodiment, a method for assessing movement of a vehicle having a plurality of wheels is provided. The method includes the steps of calculating a wheel velocity of each of the plurality of wheels, applying a rate limit to the wheel velocity of those of the plurality of wheels for which a direction of wheel rotation is different from a direction of movement of the vehicle, thereby generating adjusted wheel velocities for the plurality of wheels, and calculating a velocity of the vehicle using the adjusted wheel velocities via a controller.

In accordance with a further exemplary embodiment, a system for assessing movement of a vehicle having a plurality of wheels is provided. The system includes a plurality of sensors and a controller. Each of the plurality of sensors is coupled to and configured to provide signals representative of a direction of wheel rotation of one of the plurality of wheels. The controller is coupled to the plurality of sensors, and is configured to generate a plurality of wheel direction values using the signals, calculate an average value of the plurality of wheel direction values, and determine a direction of movement of the vehicle using the average value. Each of the plurality of wheel direction values pertains to a direction of wheel rotation of a respective wheel of the plurality of wheels.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention.

Figure 1:
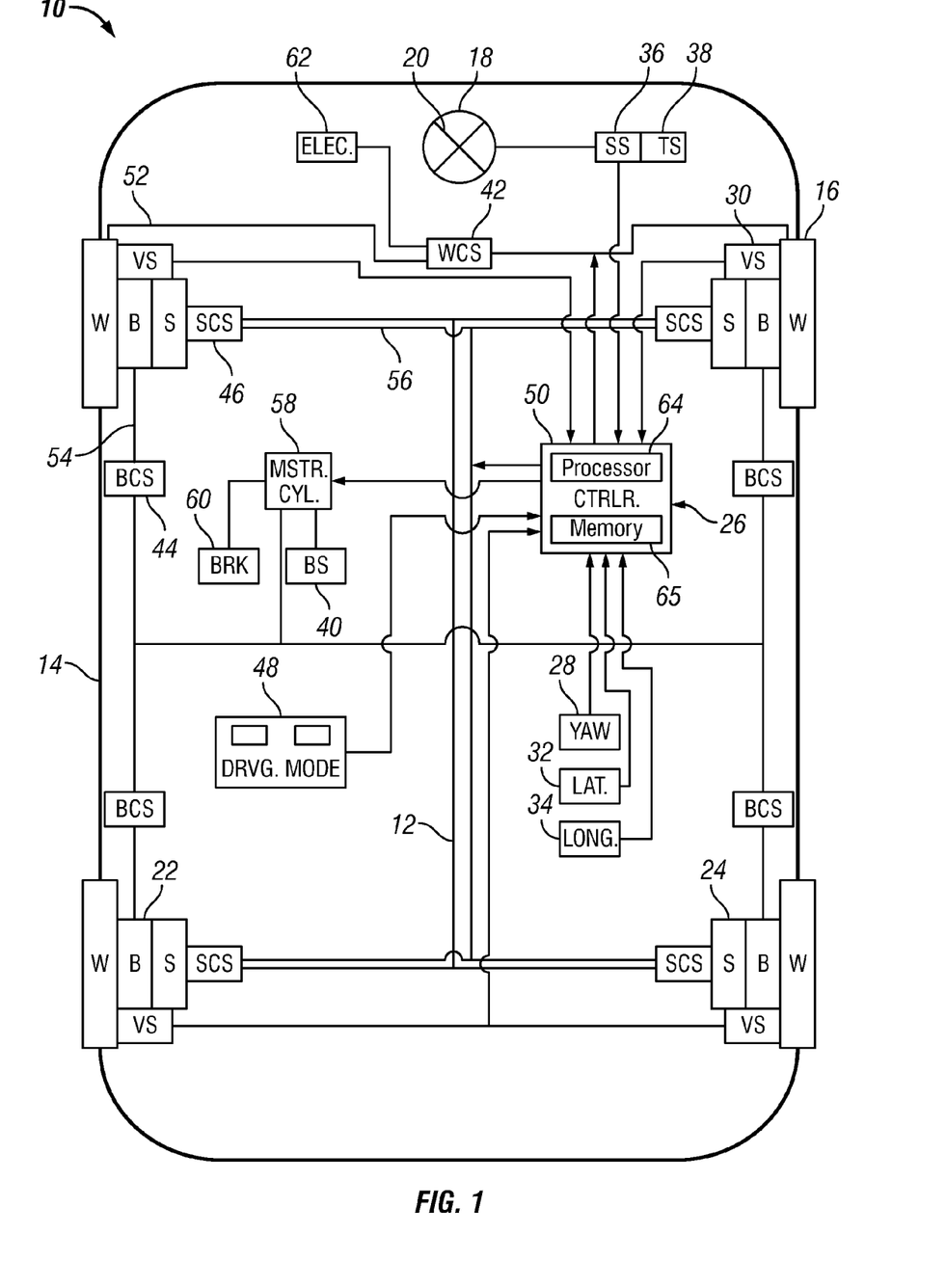
FIG. 1 is a schematic view of a vehicle with a system for assessing movement of the vehicle, including determining a direction and a velocity of the vehicle, in accordance with an exemplary embodiment.

FIG. 1 illustrates a vehicle 10, in accordance with an exemplary embodiment. The vehicle 10 may be any one of a number of different types of vehicles, including an automobile such as, for example, a sedan, a wagon, a truck, or a sport utility vehicle (SUV). Additionally, as will be appreciated by one skilled in the art, the vehicle 10 may include various additional components which are not shown in FIG. 1. As described in greater detail below, the vehicle 10 includes components for improved assessment of movement of the vehicle 10, including improved determinations of a direction of movement of the vehicle 10 and a velocity of the vehicle 10 using directional wheel velocities.

The vehicle 10 includes a chassis 12, a body 14, four wheels ("W") 16, a steering mechanism 18, a steering wheel 20, a braking mechanism 22, a suspension mechanism 24, and an integrated chassis control system (ICCS) 26. The body 14 is arranged on the chassis 12, and substantially encloses the other components of the vehicle 10. The body 14 and the chassis 12 may jointly form a frame. The wheels ("W") 16 are rotationally coupled to the chassis 12 near the respective four corners of the body 14. The steering mechanism 18 is mechanically coupled to and arranged for steering the wheels 16 by transferring a driver commanded steering torque on the steering wheel 20 to at least some of the wheels 16 and providing the driver with tactile feedback regarding the steering mechanism 18.

Both the braking mechanism 22 and the suspension mechanism are disposed between the wheels 16 and the chassis 12. The braking mechanism ("B") 22 is arranged for decelerating the wheels 16 upon command, and the suspension mechanism ("S") provides damping vibration at the wheels 16. Steering mechanism 18, braking mechanism 22, and suspension mechanism 24 are alternatively referred to as vehicle subsystems. As shown, the braking mechanism 22 and the suspension mechanism 24 may include multiple individual brakes ("B") and shock/strut assemblies ("S").

The ICCS 26 includes a yaw rate sensor 28 for sensing the actual vehicle yaw rate in degrees-per-second, a directional wheel velocity (or speed) sensor ("VS") 30 for each of the wheels 16, a lateral acceleration sensor 32, such as an accelerometer, for sensing the absolute value of the lateral acceleration of the vehicle 10, and a longitudinal acceleration sensor 34 (e.g., accelerometer) for sensing the absolute value of the vehicle's longitudinal acceleration. The ICCS 26 also includes a steering angle sensor ("SS") 36 for sensing the angle of steer for the steering wheels, a steering torque sensor ("TS") 38 for sensing the torque in the steering mechanism 18, and a brake pressure sensor ("BS") 40 for sensing the brake fluid pressure.

In the depicted embodiment, the ICCS 26 further includes a steering mechanism control system ("WCS") 42, a braking mechanism control system ("BCS") 44, and a suspension mechanism control system ("SCS") 46. The WCS 42 includes, for example, electronically controlled actuators, electric motors, and dampers for adjusting the stiffness and damping characteristics of, and the degree of steering assist associated with, the steering mechanism 18. The BCS 44 (e.g., electronically controlled actuators, electric motors, and dampers) allows for adjustment of the stiffness and damping characteristics of, and the degree of pressure-apply rate associated with, the braking mechanism 22. The SCS 46 (e.g., electronically controlled actuators, electric motors, and dampers) permits adjustment of the stiffness and damping characteristics of the suspension mechanism 24.

Also within the ICCS 26, a driving mode switch 48 and a central controller 50 are provided in the depicted embodiment. The driving mode switch 48 enables a driver to selectively choose between multiple driving modes, such as, for example, "Normal" and "Sporty" modes, where the "Normal" mode may be for highway cruising and the "Sporty" mode may be for high performance handling. The central controller 50 is arranged in operable communication with sensors 28, 30, 32, 34, 36, 38, and 40, and mechanism control systems 42, 44, and 46.

Control lines 52, 54, and 56, are depicted, for simplicity, as single lines, but represent both signal communication lines and operational links for communicating with and actuating the mechanism control systems 42, 44, and 46, respectively. The brake mechanism control system 44 is in operable communication with the central controller 50 via a brake master cylinder 58, which in turn is in operable communication with a brake pedal 60. The braking mechanism 22 may be operated by the driver via the brake pedal 60 and the master cylinder 58, or by the central controller 50 via the ICCS 26, the master cylinder 58, and brake mechanism control system 44. A vehicle electrical system 62 provides electrical power to all of the vehicle's electrically operated systems, including the central controller 50 and the mechanism control systems 42, 44, and 46.

The central controller 50 calculates a direction of movement and a directional velocity of the vehicle 10 based on information provided via the sensors 28, 30, 32, 34, 36, 38, and 40. Specifically, the central controller 50 preferably calculates the direction of movement of the vehicle 10 using signed wheel velocity values in accordance with an algorithm that implements steps of the process 200 of FIG. 2, described further below. In addition, the central controller 50 also preferably calculates the directional velocity of the vehicle 10 using the signed wheel velocity values in accordance with an algorithm that implements steps of the process 300 of FIG. 3, also described further below. The central controller 50 and various of the sensors 28, 30, 32, 34, 36, 38, and 40 (specifically, including the directional wheel velocity sensors 30) comprise a system (such as the ICCS 26, and/or one or more other systems) for assessing such movement of the vehicle 10.

In the depicted embodiment, the central controller 50 is a computer system that includes a processor 64 and a memory 65. The processor 64 performs the computation and control functions of the central controller 50, and may comprise any type of processor or multiple processors, single integrated circuits such as a microprocessor, or any suitable number of integrated circuit devices and/or circuit boards working in cooperation to accomplish the functions of a processing unit. During operation, the processor 64 executes one or more programs or other instructions preferably stored within the memory 65 and, as such, controls the general operation of the central controller 50, preferably in accordance with the steps described further below in connection with the processes 200 and 300 of FIGS. 2 and 3.

The memory 65 stores information used by the processor 64 including, but not limited to, sensor information and the maximum achievable acceleration and deceleration levels on particular surfaces, such as snow, ice, water, and mud-covered driving surfaces. Further the memory 65 includes instructions stored thereon (or in another computer-readable medium) for carrying out the processes and methods as described below. As referenced above, the memory 65 stores a program or programs that execute one or more embodiments of processes such as the processes 200, 300 described below in connection with FIGS. 2 and 3 and/or various steps thereof. The memory 65 can be any type of suitable memory, including various types of dynamic random access memory (DRAM) such as SDRAM, the various types of static RAM (SRAM) and/or various types of non-volatile memory (PROM, EPROM, and flash). It should be understood that the memory 65 may be a single type of memory component, or it may be composed of many different types of memory components. Additionally, the memory 65 and the processor 64 may be distributed within a single computer or across several different computers that collectively comprise the central controller 50. For example, a portion of the memory 65 may reside on a computer within a particular apparatus or process, and another portion may reside on a remote computer. In a preferred embodiment, the memory 65 is located could be on, or at least co-located with the processor 64 on the same chip.

Figure 2:
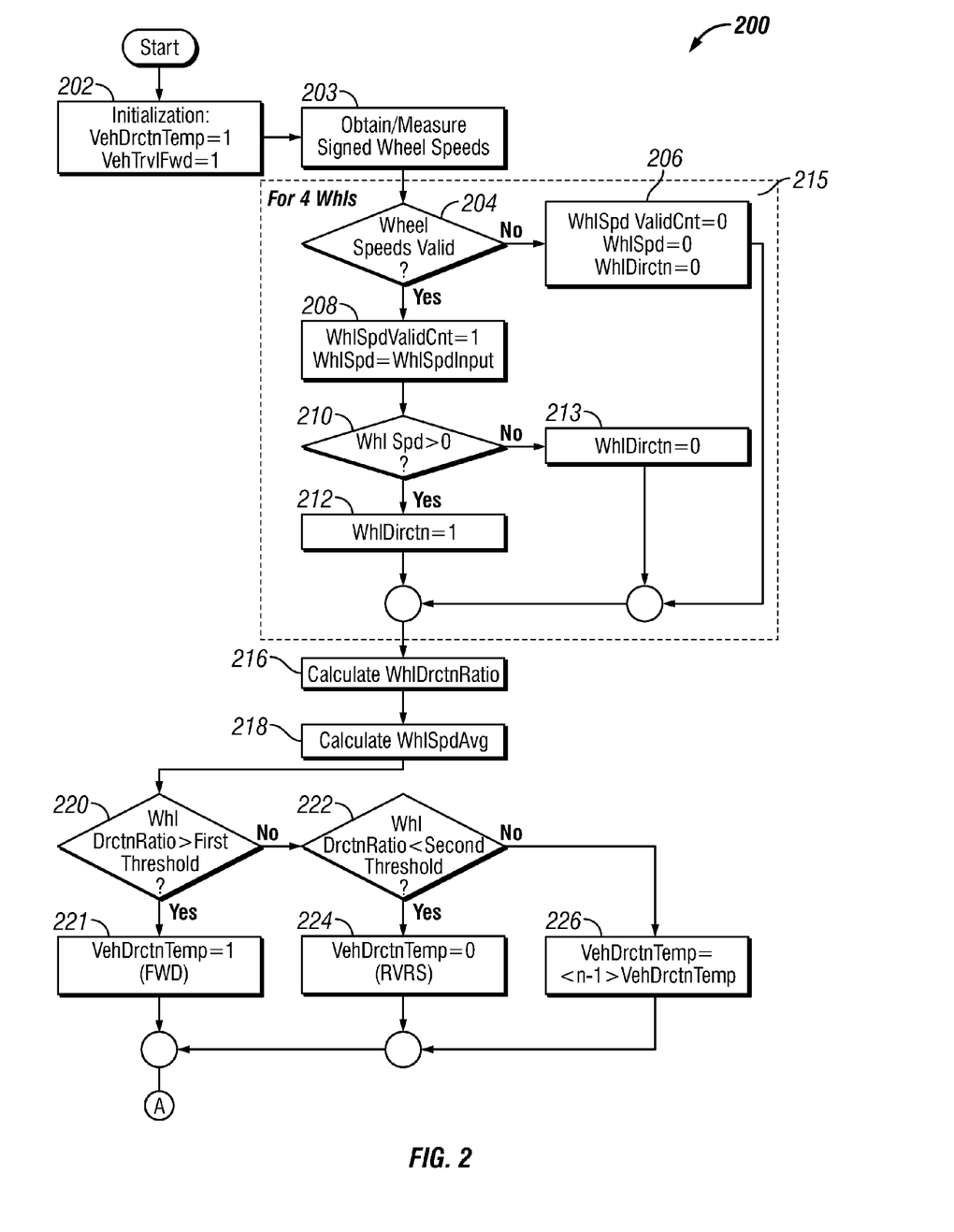
FIG. 2 is a flowchart illustrating a method for assessing movement of a vehicle, including determining a direction of a vehicle, and that can be implemented in connection with the vehicle and system of FIG. 1, in accordance with an exemplary embodiment.

FIG. 2 is a flowchart illustrating a process 200 for determining a direction of a vehicle, in accordance with an exemplary embodiment. The process 200 provides assessments of movement of the vehicle, including a determination as to a direction of the vehicle (e.g., as to whether the vehicle is moving forward or in reverse) using signed wheel speed measurements. Throughout the process 200, direction values are assigned values of one to denote movement or rotation in a forward direction, and values of zero to denote movement or rotation in a reverse direction. The process 200 can be implemented in connection with the vehicle 10, the ICCS 26, and the central controller 50 of FIG. 1.

As depicted in FIG. 2, the process 200 begins with an initialization of a temporary vehicle direction flag (VehDrctnTemp) and a vehicle travel forward flag (VehTrvlFwd) (step 202). In the depicted embodiment, the temporary vehicle direction flag (VehDrctnTemp) and the vehicle travel forward flag (VehTrvlFwd) are both set equal to one (representing forward movement), preferably by the processor 64 of the central controller 50 of FIG. 1.

Signed wheel speeds are then measured and/or obtained (step 203). The signed wheel speeds are preferably measured by the directional velocity sensors 30 of FIG. 1 with respect to each of the wheels 16 of FIG. 1, and signals representative thereof are provided to the processor 64 of FIG. 1 for processing. Each signed wheel speed preferably includes a current or most recent direction and magnitude of a speed (or velocity) pertaining to rotation of a respective wheel 16. As used herein, the words "speed" and "velocity" are used interchangeably.

For each of the wheel speeds of step 203, a determination is made as to whether such wheel speed is valid (step 204). A wheel speed may be invalid, for example, if the signal pertaining to the wheel speed is not provided by the respective directional velocity sensor 30 of FIG. 1 and/or is not received or read by the processor 64 of FIG. 1, and/or if the signal is not provided, received, and/or read at an appropriate or expected time, and/or is outside a range of possible or expected values. The determinations of the validity of the wheel speeds are preferably performed by the processor 64 of FIG. 1.

For each wheel speed of step 203, if it is determined that such wheel speed is invalid, then a wheel speed valid count (WhlSpdValidCnt), a wheel speed value (WhlSpd), and a wheel direction value (WhlDirctn) for the particular wheel/wheel speed are each set equal to zero (step 206). This step is preferably performed by the processor 64 of FIG. 1. The process then proceeds to step 216, described further below, after steps 204-214 are performed for each of the wheels of the vehicle.

Conversely, if it is determined that the wheel speed is valid, then the wheel speed valid count (WhlSpdValidCnt) is set equal to one, and the wheel speed value (WhlSpd) is set equal to the wheel speed for the respective wheel from step 203 (WhlSpdInput) (step 208). This step is preferably performed by the processor 64 of FIG. 1.

A determination is then made as to whether the wheel speed (WhlSpd) is greater than zero (step 210). This determination is preferably performed by the processor 64 of FIG. 1.

If it is determined that the wheel speed (WhlSpd) is greater than zero, then the wheel direction value (WhlDirctn) is set equal to one (step 212). This step is preferably performed by the processor 64 of FIG. 1. Conversely, if it is determined that the wheel speed (WhlSpd) is less than or equal to zero, then the wheel direction value (WhlDirctn) is set equal to zero (step 214). This step is also preferably performed by the processor 64 of FIG. 1.

Steps 204-214 (also denoted in FIG. 2 as a combined sub-process 215) are preferably performed for each of the wheels of the vehicle. Once this has been done, a wheel direction ratio (WhlDrctnRatio) is calculated (step 216). The wheel direction ratio (WhlDrctnRatio) is preferably calculated by the processor 64 of FIG. 1 by adding each of the wheel direction values (WhlDirctn) of each of the valid wheel speeds and then dividing this sum by the number of valid wheel speeds. The wheel direction value (WhlDrctnRatio) thus represents an average wheel direction value of the wheels having valid wheel speeds.

In addition, an average wheel speed (WhlSpdAvg) is calculated (step 218). The average wheel speed (WhlSpdAvg) is preferably calculated by the processor 64 of FIG. 1 by adding each of the valid wheel speeds (WhlSpd) and then dividing this sum by the number of valid wheel speeds (WhlSpd).

A determination is then made as to whether the wheel direction ratio (WhlDrctnRatio) of step 216 is greater than a first predetermined ratio threshold (step 220). The first predetermined ratio threshold represents a threshold corresponding to a number or percentage of wheels that must be moving in a forward direction for there to be a determination that the vehicle is moving in the forward direction. In the depicted embodiment, the first predetermined ratio threshold is equal to 0.6. In this example, the wheel direction ratio (WhlDrctnRatio) is greater than the first predetermined value if more than sixty percent of the wheel direction values (WhlDirctm) are equal to one (in other words, corresponding to forward rotation of the respective wheels). For example, in a vehicle having four wheels, each with valid wheel speed values, the wheel direction ratio (WhlDrctnRatio) would be greater than 0.6 if at least three of these four wheels are moving in the forward direction. By way of further example, in a vehicle having three wheels with valid wheel speed values, the wheel direction ratio (WhlDrctnRatio) would be greater than 0.6 if at least two of these three wheels are moving in the forward direction, and so on. The determination of step 220 is preferably performed by the processor 64 of FIG. 1.

If it is determined that the wheel direction ratio (WhlDrctnRatio) is greater than the first predetermined ratio threshold, then a determination is made that an initial or temporary value of the vehicle direction of movement (VehDrctnTemp) is equal to one (representing forward movement of the vehicle) (step 221). This determination is preferably performed by the processor 64 of FIG. 1. The process then proceeds to step 228, described further below.

Conversely, if it is determined that the wheel direction ratio (WhlDrctnRatio) is less than or equal to the first predetermined ratio threshold, then a determination is made as to whether the wheel direction ratio (WhlDrctnRatio) is less than a second predetermined ratio threshold (step 222). The second predetermined ratio threshold represents a threshold corresponding to a number or percentage of wheels that must be moving in a reverse direction for there to be a determination that the vehicle is moving in the reverse direction. In the depicted embodiment, the second predetermined ratio threshold is equal to 0.4. In this example, the wheel direction ratio (WhlDrctnRatio) is less than the second predetermined value if more than sixty percent of the wheel direction values (WhlDirctm) are equal to zero (in other words, corresponding to rotation of the respective wheels in reverse). For example, in a vehicle having four wheels with valid wheel speed values, the wheel direction ratio (WhlDrctnRatio) would be less than 0.4 if at least three of these four wheels are moving in the reverse direction. By way of further example, in a vehicle having three wheels with valid wheel speed values, the wheel direction ratio (WhlDrctnRatio) would be less than 0.4 if at least two of these three wheels are moving in the reverse direction, and so on. The determination of step 222 is preferably performed by the processor 64 of FIG. 1.

If it is determined that the wheel direction ratio (WhlDrctnRatio) is less than the second predetermined ratio threshold, then a determination is made that an initial or temporary value of the vehicle direction of movement (VehDrctnTemp) is equal to zero, representing movement of the vehicle in reverse (step 224). This determination is preferably performed by the processor 64 of FIG. 1. The process then proceeds to step 228, described further below.

Conversely, if it is determined that the wheel direction ratio (WhlDrctnRatio) is less than or equal to the first predetermined ratio threshold and greater than or equal to the second predetermined ratio threshold, then a determination is made that an initial or temporary value of the vehicle direction of movement (VehDrctnTemp) is equal to a prior value of the vehicle direction of movement (<n−1>VehDrctnTemp) (step 226). In a preferred embodiment, the initial or temporary value of the vehicle direction of movement (VehDrctnTemp) is determined at a prior point in time during a prior iteration of the process 200. However, in other embodiments, the prior value of the vehicle direction of movement (<n−1>VehDrctnTemp) may be determined using one or more other techniques, such as, by way of example only, inertial sensor measurement data. Step 226 is preferably performed by the processor 64 of FIG. 1. The process then proceeds to step 228, described directly below.

During step 228, a determination is made as to whether the initial or temporary value of the vehicle direction of movement (VehDrctnTemp) is equal to the prior value of the vehicle direction of movement (<n−1>VehDrctnTemp). This determination is preferably performed by the processor 64 of FIG. 1.

If it is determined that the initial or temporary value of the vehicle direction of movement (VehDrctnTemp) is not equal to the prior value of the vehicle direction of movement (<n−1>VehDrctnTemp), then a timer is set equal to zero (step 230). This step is preferably performed by the processor 64 of FIG. 1.

In addition, the vehicle travel forward flag (VehTrvlFwd) is set equal to a prior value of the vehicle travel forward flag (<n−1>VehTrvlFwd) from a prior iteration or to the value set in step 202, whichever is most recent (step 232). Accordingly, the initial or temporary value of the vehicle direction of movement (VehDrctnTemp) is disregarded, and the current direction of movement of the vehicle is determined to remain equal to the prior value of the vehicle direction of movement (<n−1>VehDrctnTemp). This step is preferably performed by the processor 64 of FIG. 1. The process then preferably returns to step 203 for a new iteration during operation of the vehicle.

Conversely, if it is determined that the initial or temporary value of the vehicle direction of movement (VehDrctnTemp) is equal to the prior value of the vehicle direction of movement (<n−1>VehDrctnTemp), then the timer runs (step 234). The timer is preferably operating by the processor 64 of FIG. 1.

A determination is then made as to whether the wheel speed average (WhlSpdAvg) of step 218 is within a predetermined wheel speed range (step 236). The predetermined wheel speed range represents a range of speeds within which it would be expected that the vehicle might reverse direction. For example, the vehicle would typically be expected to reverse direction at low speeds (for example, while driving in a parking lot) but not at high speeds (for example, while driving on a freeway). In the depicted embodiment, the predetermined wheel speed range is between two miles per hour and ten miles per hour. However, this may vary in other embodiments. The determination of step 236 is preferably performed by the processor 64 of FIG. 1.

If it is determined that the wheel speed average (WhlSpdAvg) is not within the predetermined wheel speed range, then the process proceeds to the above-described step 232, in which the vehicle travel forward flag (VehTrvlFwd) is set equal to a prior value of the vehicle travel forward flag (<n−1>VehTrvlFwd) from a prior iteration or to the value set in step 202, (preferably, whichever is most recent), the initial or temporary value of the vehicle direction of movement (VehDrctnTemp) is disregarded, and the current direction of movement of the vehicle is determined to remain equal to the prior value of the vehicle direction of movement (<n−1>VehDrctnTemp). The process then preferably returns to step 203 for a new iteration during operation of the vehicle.

Conversely, if it is determined that the wheel speed average (WhlSpdAvg) is within the predetermined wheel speed range, then a determination is made as to whether the timer has exceeded a predetermined timer threshold (step 238). The predetermined timer threshold preferably represents a minimum amount of time in which a change in vehicle direction (from forward to reverse, or vice versa) would be feasible or likely to have occurred. In the depicted embodiment, the predetermined timer threshold is equal to one second. However, this may vary in other embodiments. In addition, the timer preferably represents an amount of time between iterations, and, specifically, an amount of time between the prior direction determinations of an immediately preceding iteration and the current direction determinations of the current iteration. The determination of step 238 is preferably performed by the processor 64 of FIG. 1.

If it is determined that the timer has not exceeded the predetermined timer threshold, then the process proceeds to the above-described step 232, in which the vehicle travel forward flag (VehTrvlFwd) is set equal to a prior value of the vehicle travel forward flag (<n−1>VehTrvlFwd) from a prior iteration or to the value set in step 202, (preferably, whichever is most recent), the initial or temporary value of the vehicle direction of movement (VehDrctnTemp) is disregarded, and the current direction of movement of the vehicle is determined to remain equal to the prior value of the vehicle direction of movement (<n−1>VehDrctnTemp). The process then preferably returns to step 203 for a new iteration during operation of the vehicle.

Conversely, if it is determined that the timer has exceeded the predetermined timer threshold, then the vehicle travel forward flag (VehTrvlFwd) is set equal to the initial or temporary value of the vehicle direction of movement (VehDrctnTemp) (step 240). Accordingly, in the depicted embodiment, the initial or temporary value of the vehicle direction of movement (VehDrctnTemp) is deemed to represent the vehicle's direction of movement only if the average wheel speed is within the predetermined wheel speed range (as determined in step 236) and the timer has exceeded the predetermined timer threshold (as determined in step 238).

In addition, in the depicted embodiment, an additional sub-process 241 is performed with respect to each of the wheels. Specifically, a determination is first performed as to whether the vehicle travel forward flag (VehTrvlFwd) is equal to the wheel direction value (WhlDrctn) for the particular wheel (step 242). This determination is preferably performed by the processor 64 of FIG. 1.

If it is determined that the vehicle travel forward flag (VehTrvlFwd) is equal to the wheel direction value (WhlDrctn) for the particular wheel, then a differential flag (WhlVehDrctnDiff) for the particular vehicle is set equal to zero (step 244), indicating that the wheel is travelling in the same direction as the vehicle. This step is preferably performed by the processor 64 of FIG. 1.

Conversely, if it is determined that the vehicle travel forward flag (VehTrvlFwd) is not equal to the wheel direction value (WhlDrctn) for the particular wheel, then the differential flag (WhlVehDrctnDiff) for the particular vehicle is set equal to one (step 246), indicating that the wheel is travelling in a different direction as the vehicle.

Following step 244 or step 246 (whichever is performed for a particular wheel), the sub-process 241 preferably repeats for each of the wheels of the vehicle. These steps are preferably performed by the processor 64 of FIG. 1. The process then preferably returns to step 203 for a new iteration during operation of the vehicle. Accordingly, the process 200 provides for improved determinations of a direction of movement of the vehicle using signed wheel velocities that can be utilized in a variety of contexts even in which typical techniques may not provide optimal results, for example when the vehicle is moving up a hill, the vehicle is in neutral, the vehicle is transitioning to braking on a slick or icy surface, and/or when some wheels are moving in a different direction from one another or the vehicle as a whole.

Figure 3:
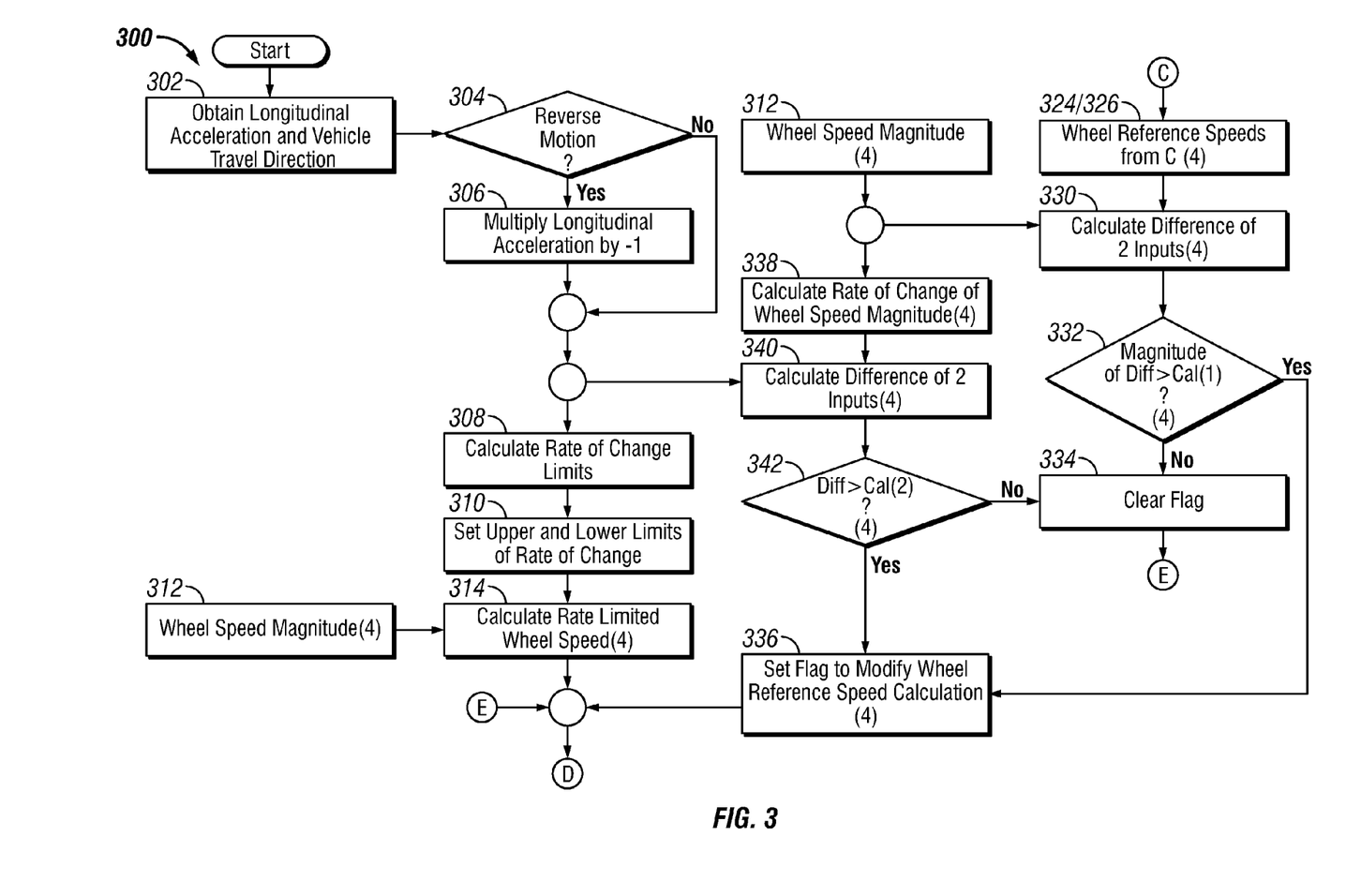
FIG. 3 is a flowchart illustrating a method for assessing movement of a vehicle, including determining a velocity of a vehicle, and that can be implemented in connection with the vehicle and system of FIG. 1 and the method of FIG. 2, in accordance with an exemplary embodiment.

FIG. 3 is a flowchart illustrating a process 300 for determining a velocity of a vehicle, in accordance with an exemplary embodiment. The process 300 can be implemented in connection with the vehicle 10, the ICCS 26, and the central controller 50 of FIG. 1, and the process 200 of FIG. 2. The process 300 provides assessments of movement of the vehicle, including a determination as to a signed velocity for and indicative of both forward and reverse motions of the vehicle using signed wheel speed measurements and wheel slip values. As with the process 200 of FIG. 1, throughout the process 300, direction values are assigned values of one to denote movement or rotation in a forward direction, and values of zero to denote movement or rotation in a reverse direction.

As depicted in FIG. 3, the process 300 begins with the step of obtaining a longitudinal acceleration and a vehicle travel direction for the vehicle (step 302). The longitudinal acceleration is preferably obtained by the processor 64 of FIG. 1 from the longitudinal acceleration sensor 34 of FIG. 1. The vehicle travel direction is preferably generated by the processor 64 of FIG. 1 using the steps of the above-described process 200 of FIG. 2.

A determination is made as to whether the vehicle travel direction of step 202 indicates that the vehicle is moving in a reverse direction or motion (step 304). This determination is preferably performed by the processor 64 of FIG. 1.

If it is determined that the vehicle travel direction of step 202 indicates that the vehicle is moving in a reverse direction or motion, then the longitudinal acceleration of step 302 is multiplied by a coefficient of negative one (−1) (step 306). This step is preferably performed by the processor 64 of FIG. 1.

In addition, rate of change limits are calculated for the velocities of the wheels using the longitudinal acceleration of step 302 (step 308). Upper and lower limits for the rate of change of the velocities of the wheels are established accordingly (step 310). Steps 308 and 310 are preferably performed by the processor 64 of FIG. 1.

In addition, wheel speed magnitudes are measured or obtained (step 312). Wheel speed magnitudes are preferably measured for each of the wheels 16 of FIG. 1 by the directional wheel velocity sensors 30 of FIG. 1 and provided to the processor 64 of FIG. 1 for processing.

Rate limited wheel speeds are then calculated (step 314). Specifically, the rate limited wheel speeds are preferably calculated for each of the wheels 16 of FIG. 1 by the processor 64 of FIG. 1 using the respective wheel speed magnitude of step 312 for each of the wheels 16 and subjecting each wheel speed magnitude to the upper rate limit and the lower rate limit of step 310. This calculation is preferably performed by the processor 64 of FIG. 1. It will be appreciated by one of skill in the art that the rate limited wheel speeds may be calculated using one or more of various techniques known in the art, such as, by way of example, those described in commonly assigned U.S. Pat. No. 7,617,036 (Tan, et al.), incorporated herein by reference.

A determination is made as to whether a reference speed flag has been set (step 316). The reference speed flag is set when modified wheel reference speed calculations are desired, as determined in step 336 (described further below). The determination of step 316 is preferably performed by the processor 64 of FIG. 1.

If it is determined that the reference speed flag has been set, then modified reference speed values are calculated (step 318). The modified reference speed values are preferably calculated for each of the wheels 16 of FIG. 1 by the processor 64 of FIG. 1 using the rate limited wheel speeds of step 314. These calculations are preferably performed by the processor 64 of FIG. 1. The process then proceeds to steps 320 and 322, described below. Conversely, if it is determined that the reference speed flag has not been set, then modified wheel speeds are not calculated, and the process proceeds directly to steps 320 and 322. It will be appreciated by one of skill in the art that wheel reference speeds may be modified according to various dynamic conditions using one or more of various techniques known in the art, such as, by way of example, those described in commonly assigned U.S. Pat. No. 7,617,036 (Tan, et al.), incorporated herein by reference.

During steps 320 and 322, information is obtained with respect to each wheel as to whether a direction of rotation of the wheel is different from the direction of travel of the vehicle (step 320), and a determination is made with respect to each wheel as to whether a mismatch flag is set (step 322). Preferably these steps are performed by the processor 64 of FIG. 1 using information from the sub-process 241 of the process 200 of FIG. 2, and the mismatch flag of step 322 corresponds to the differential flag (WhlVehDrctnDiff) of steps 244 and 246 of FIG. 2. Specifically, for each wheel, if the differential flag (WhlVehDrctnDiff) is equal to one, then such wheel is determined to be moving in an opposite direction than the direction of the vehicle (for example, the wheel is traveling forward and the vehicle is traveling in reverse, or vice versa), and the mismatch flag is determined to be set. Conversely, for each wheel, if the differential flag (WhlVehDrctnDiff) is equal to zero, then such wheel is determined to be moving in the same direction as the vehicle, and the mismatch flag is not set.

If it is determined that the mismatch flag is not set, then the wheel reference speeds for each of the wheels are set equal to the respective modified wheel speeds of step 318 (step 324). This step is preferably performed by the processor 64 of FIG. 1. The process then proceeds to steps 330 and 340, both described further below.

Conversely, if it is determined that the mismatch flag is set, then the wheel reference speeds for each of the wheels are set equal to zero (step 326). The process then proceeds to step 330, described directly below, and step 340, described further below.

During step 330, the wheel reference speeds from step 324 or step 326 (whichever step is performed in a particular iteration) are utilized, along with the wheel speed magnitudes of step 312, to calculate a difference between inputs for each of the wheels. Specifically, for each wheel, a difference between the wheel speed magnitude of step 312 and the wheel reference speed of step 324 or step 326 (whichever step is performed in the current iteration) is calculated. These calculations are preferably performed by the processor 64 of FIG. 1.

For each of the wheels, a determination is then made as to whether a magnitude of the difference from step 330 is greater than a first predetermined threshold (step 332). Preferably the first predetermined threshold represents an expected or allowable difference between the wheel speed magnitude and the wheel reference speed under typical conditions and driving surfaces and in which the wheels are operating properly and measurements pertaining thereto are obtained correctly. These determinations are preferably made by the processor 64 of FIG. 1.

If it is determined that the magnitude of the difference from step 330 is less than or equal to the first predetermined threshold for a particular wheel, then the reference speed flag for such wheel is cleared (step 334). This step is preferably performed by the processor 64 of FIG. 1. This information is utilized in subsequent iterations of step 316, as denoted in FIG. 3.

Conversely, if it is instead determined during 332 that the magnitude of the difference from step 330 is greater than the first predetermined threshold for a particular wheel, then the respective wheel/wheel velocity is deemed to be unstable, and the reference speed flag for such wheel is set (step 336), so that rate limits will be applied. Specifically, as denoted in FIG. 3, this information is utilized in subsequent iterations of step 316. This step is preferably performed by the processor 64 of FIG. 1.

The wheel speed magnitude of step 312 is also used to calculate a rate of change of wheel speed magnitude for each of the wheels (step 338). These calculations are preferably performed by the processor 64 of FIG. 1.

In addition, the rate of change of the wheel speed magnitudes of step 338 are used, along with the longitudinal acceleration of steps 302 and/or 306, to calculate a second difference between inputs for each of the wheels (step 340). Specifically, for each wheel, a difference between current and prior values of the wheel speed magnitudes for each wheels is calculated. These calculations are preferably performed by the processor 64 of FIG. 1.

For each of the wheels, a determination is then made as to whether a magnitude of the difference from step 340 is greater than a second predetermined threshold (step 342). Preferably the second predetermined threshold represents an expected or allowable difference between the current and prior values of the wheel speed magnitudes under typical conditions and driving surfaces and in which the wheels are operating properly and measurements pertaining thereto are obtained correctly. These determinations are preferably made by the processor 64 of FIG. 1.

If it is determined that the magnitude of the difference from step 340 is less than or equal to the second predetermined threshold for a particular wheel, then the process proceeds to the above-referenced step 334, in which the reference speed flag for such wheel is cleared. This information is utilized in subsequent iterations of step 316, as denoted in FIG. 3.

Conversely, if it is determined that the magnitude of the difference from step 340 is greater than the second predetermined threshold for a particular wheel, then the respective wheel/wheel speed is deemed to be unstable, and the process instead proceeds to the above-referenced step 336, as the reference speed flag for such wheel is set and utilized for the application of rate limits. Specifically, this information is utilized in subsequent iterations of step 316, as denoted in FIG. 3.

In addition, the wheel reference speeds of step 324 or step 326 (whichever step is performed in the current iteration) are utilized to calculate a vehicle reference velocity magnitude with respect to the surface on which the wheels are moving (step 340). Preferably, the processor 64 of FIG. 1 calculates the vehicle reference velocity magnitude by calculating an average value of the wheel reference speeds.

The vehicle reference velocity magnitude of step 340 is then utilized, along with the vehicle travel direction of step 302, to calculate a signed vehicle reference velocity. The signed vehicle reference velocity includes a direction and magnitude of the calculated velocity of the vehicle with respect to the road or other surface on which the vehicle is travelling. The signed vehicle reference velocity is preferably calculated by the processor 64 of FIG. 1. The process then preferably returns to step 302 for a new iteration during operation of the vehicle. The process 300 thus provides for improved determinations of signed vehicle velocity using signed wheel velocities for and indicative of both forward and reverse motions that can be utilized in a variety of contexts even in which typical techniques may not provide optimal results, for example when the vehicle is moving up a hill, the vehicle is in neutral, the vehicle is transitioning to braking on a slick or icy surface, and/or when some wheels are moving in a different direction from one another or the vehicle as a whole.

Accordingly, improved methods and systems are provided for assessing movement of vehicles. The improved method and systems provide for potentially improved determinations of a direction of a vehicle and a directional velocity of the vehicle using directional wheel velocities. This provides for potentially more accurate determinations under a wide range of operating and/or environmental conditions for the vehicle, including conditions in which typical techniques may not provide optimal results, such as, by way of example, if the vehicle is in neutral, moving along a hill, and/or transitioning during braking to a wet or icy surface.

It will be appreciated that the disclosed systems and processes may differ from those depicted in the Figures and/or described above. For example, the vehicle 10, the ICCS 26, the central controller 50, the processor 64, and/or components thereof may differ from those of FIG. 1 and/or described above. Similarly, certain steps of the process 200 and/or the process 300 may vary from those depicted in FIGS. 2 and 3, respectively, and/or described above. It will similarly be appreciated that various steps of the process 200 and/or the process 300 may occur simultaneously or in an order that is otherwise different from that depicted in FIG. 2 and FIG. 3, respectively, and/or described above. It will similarly be appreciated that the disclosed methods and systems may be used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for assessing movement of a vehicle having a plurality of wheels, the method comprising the steps of:

obtaining a plurality of wheel direction values, each of the plurality of wheel direction values pertaining to a direction of wheel rotation of a respective wheel of the plurality of wheels;

calculating, using a controller, an average value of the plurality of wheel direction values;

determining, using said controller, a direction of movement of the vehicle using the average value;

comparing, using said controller, the direction of wheel rotation of each of the plurality of wheels with the direction of movement of the vehicle;

calculating, using said controller, a wheel velocity of each of the plurality of wheels;

applying, using said controller, a rate limit to the wheel velocity of those of the plurality of wheels for which the direction of wheel rotation of the respective wheel is different from the direction of movement of the vehicle, thereby generating adjusted wheel velocities for the plurality of wheels; and calculating, using said controller, a velocity of the vehicle using the adjusted wheel velocities.

2. The method of claim 1, wherein the step of determining the direction of movement of the vehicle comprises the steps of:

determining that the vehicle is moving forward if the plurality of wheel direction values indicate that at least a first predetermined number of the plurality of wheels are moving forward; and determining that the vehicle is moving in reverse if the plurality of wheel direction values indicate that at least a second predetermined number of the plurality of wheels are moving in reverse.

3. The method of claim 1, further comprising the steps of:

assigning a first value to each of the plurality of wheel direction values that indicate that the respective wheel is moving in a forward direction, for use in calculating the average value; and assigning a second value to each of the plurality of wheel direction values that indicate that the respective wheel is moving in a reverse direction, for use in calculating the average value.

4. The method of claim 1, further comprising the steps of:

determining a prior direction of movement of the vehicle;

calculating an initial value representing a subsequent direction of movement of the vehicle using the average value; and determining an average wheel speed of the plurality of wheels;

wherein the step of determining the direction of movement of the vehicle comprises the steps of:

determining that the vehicle is moving in the prior direction if the average wheel speed is less than a predetermined threshold; and determining that the vehicle is moving in the subsequent direction if the average wheel speed is greater than the predetermined threshold.

5. The method of claim 4, wherein the prior direction is determined at a first time, the initial value is determined at a second time that is subsequent to the first time, and the method further comprises the step of:

determining that the vehicle is moving in the subsequent direction only on the additional condition that a difference between the second time and the first time is greater than a second predetermined threshold.

6. The method of claim 1, further comprising the step of:

determining whether each of the plurality of wheel direction values is valid;

wherein the step of calculating the average value comprises the step of calculating the average value using only those of the plurality of wheel direction values that are valid.

7. The method of claim 1, further comprising the step of:

determining which, if any, of the wheel velocities are unstable;

wherein the step of applying the rate limit further comprises the step of applying the rate limit to the wheel velocity of those of the plurality of wheels for which the wheel velocity is unstable.

8. The method of claim 1, further comprising the steps of:

determining a longitudinal acceleration of the vehicle; and calculating the rate limit using the longitudinal acceleration.

9. A method for assessing movement of a vehicle having a plurality of wheels, the method comprising the steps of:

calculating, using a controller, a wheel velocity of each of the plurality of wheels;

applying, using said controller, a rate limit to the wheel velocity of those of the plurality of wheels for which a direction of wheel rotation is different from a direction of movement of the vehicle, thereby generating adjusted wheel velocities for the plurality of wheels; and calculating, using said controller, a velocity of the vehicle using the adjusted wheel velocities.

10. The method of claim 9, further comprising the step of:

determining which, if any, of the wheel velocities are unstable;

wherein the step of applying the rate limit further comprises the step of applying the rate limit to the wheel velocity of those of the plurality of wheels for which the wheel velocity is unstable.

11. The method of claim 9, further comprising the steps of:

determining a longitudinal acceleration of the vehicle; and calculating the rate limit using the longitudinal acceleration.

12. A system for assessing movement of a vehicle having a plurality of wheels, the system comprising:

a plurality of sensors, each of the plurality of sensors coupled to and configured to provide signals representative of a direction of wheel rotation of one of the plurality of wheels; and a controller coupled to the plurality of sensors and configured to:

generate a plurality of wheel direction values using the signals, each of the plurality of wheel direction values pertaining to a direction of wheel rotation of a respective wheel of the plurality of wheels;

calculate an average value of the plurality of wheel direction values;

determine a direction of movement of the vehicle using the average value;

compare the direction of wheel rotation of each of the plurality of wheels with the direction of movement of the vehicle;

calculate a wheel velocity of each of the plurality of wheels;

apply a rate limit to the wheel velocity of those of the plurality of wheels for which the direction of wheel rotation is different from the direction of movement of the vehicle, thereby generating adjusted wheel velocities for the plurality of wheels; and calculate a velocity of the vehicle using the adjusted wheel velocities.

13. The system of claim 12, wherein the controller is further configured to:

determine that the vehicle is moving forward if the plurality of wheel direction values indicate that at least a first predetermined number of the plurality of wheels are moving forward; and determine that the vehicle is moving in reverse if the plurality of wheel direction values indicate that at least a second predetermined number of the plurality of wheels are moving in reverse.

14. The system of claim 12, wherein the controller is further configured to:

determine a prior direction of movement of the vehicle;

calculate an initial value representing a subsequent direction of movement of the vehicle using the average value;

determine an average wheel speed of the plurality of wheels;

determine that the vehicle is moving in the prior direction if the average wheel speed is less than a predetermined threshold; and determine that the vehicle is moving in the subsequent direction if the average wheel speed is greater than the predetermined threshold.

15. The system of claim 14, wherein the prior direction is determined at a first time, the initial value is determined at a second time that is subsequent to the first time, and the controller is further configured to determine that the vehicle is moving in the subsequent direction only on the additional condition that a difference between the second time and the first time is greater than a second predetermined threshold.

16. The system of claim 12, wherein the controller is further configured to:

determine whether each of the plurality of wheel direction values is valid; and calculate the average value using only those of the plurality of wheel direction values that are valid.

17. The system of claim 1, wherein the controller is further configured to:

determine which, if any, of the wheel velocities are unstable; and apply the rate limit to the wheel velocity of those of the plurality of wheels for which the wheel velocity is unstable.

18. The system of claim 1, wherein the controller is further configured to:

determine a longitudinal acceleration of the vehicle; and calculate the rate limit using the longitudinal acceleration.

* * * * *